United States Patent
Wrobel

(10) Patent No.: US 7,039,172 B2
(45) Date of Patent: May 2, 2006

(54) DUAL LANGUAGE CALLER ID WITH ASIAN LANGUAGE SUPPORT

(75) Inventor: Charles C. Wrobel, Sammamish, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 36 days.

(21) Appl. No.: 10/143,759

(22) Filed: May 14, 2002

(65) Prior Publication Data

US 2003/0215074 A1 Nov. 20, 2003

(51) Int. Cl.
*H04M 1/56* (2006.01)
*H04M 15/06* (2006.01)
*H04B 7/14* (2006.01)

(52) U.S. Cl. .................. 379/142.04; 379/142.01; 379/142.17; 455/415

(58) Field of Classification Search ........... 379/142.01, 379/142.04, 142.06, 142.1, 142.13, 142.14, 379/142.15, 142.16, 142.17, 93.17, 88.19, 379/88.2, 201.04, 207.14, 207.15; 455/414, 455/415, 416, 417

See application file for complete search history.

(56) References Cited

U.S. PATENT DOCUMENTS

| | | | |
|---|---|---|---|
| 4,872,196 A * | 10/1989 | Royer et al. ................ 455/564 |
| 5,386,459 A * | 1/1995 | Veeneman et al. ........ 379/93.01 |
| 5,436,436 A * | 7/1995 | Matsukawa ................. 235/380 |
| 5,608,788 A * | 3/1997 | Demlow et al. ........ 379/142.07 |
| 5,774,537 A * | 6/1998 | Kim .......................... 379/157 |
| 5,878,124 A * | 3/1999 | Griesmer et al. ...... 379/357.01 |
| 5,907,604 A * | 5/1999 | Hsu ....................... 379/142.06 |
| 5,933,476 A * | 8/1999 | Hansen et al. ................ 379/52 |
| 5,946,382 A * | 8/1999 | Sugahara .................... 379/157 |
| 6,016,341 A * | 1/2000 | Lim ...................... 379/142.01 |
| 6,192,115 B1 * | 2/2001 | Toy et al. .................... 379/130 |
| 6,226,500 B1 * | 5/2001 | Nonami ....................... 455/91 |
| 6,496,844 B1 * | 12/2002 | Hetherington et al. ...... 715/536 |
| 6,760,411 B1 * | 7/2004 | Dybedokken et al. ... 379/88.06 |

* cited by examiner

*Primary Examiner*—Quoc Tran
(74) *Attorney, Agent, or Firm*—Birch, Stewart, Kolasch & Birch, LLP

(57) ABSTRACT

A caller ID system and method includes the ability to transmit a party's name in native language characters along with a transliteration of the party's name into global characters, such as Latin characters. The native characters could include Chinese, Japanese or Korean characters. The caller ID information can be used to indicate a calling party's name to a called party, and/or to indicate a called party's name to a calling party. The user of the caller ID device can select native languages to be displayed. Whenever caller ID information includes a native language name matching the user's selected languages, the native language name will be displayed on the caller ID device. Otherwise, the transliteration of the native language name will be displayed.

28 Claims, 4 Drawing Sheets

DUAL LANGUAGE CALLER ID WITH ASIAN LANGUAGE SUPPORT

BACKGROUND OF THE INVENTION

1. Field of the Invention

The present invention relates to supplementary services associated with telephone service. More particularly, the present invention relates to an improved caller ID system and method.

2. Discussion of the Related Art

In households with Asian members and in companies with Asian employees, it is often necessary, or preferred, to communicate in a native language using the characters of the native language. To this end, some telephone manufactures have provided telephones with display drivers for various Asian character fonts. Therefore, setup menus and status information can be displayed and navigated in a person's native language, using the native language's characters.

Many of these households and companies also enjoy the benefits of caller ID. Caller ID records a log of incoming calls and allows for call screening. Typically, the caller ID information, transmitted in known caller ID systems, only includes Latin, Greek or Cyrillic characters. Therefore, in typical caller ID systems, when a person receives a phone call from a foreign friend or business colleague, a transliteration of the caller's name is displayed in Latin, Greek or Cyrillic characters (hereinafter referred to as "global" characters). Of course, many countries, such as Japan, Korean, Taiwan, and China, have native languages which do not use global characters. Therefore, if a name is to be displayed at all on the caller ID's display, the name will be the transliteration of the native language name into global characters. This state of the art can be disadvantageous.

When the person receiving the call understands the native language of the caller, they would often prefer to have the native name displayed on the caller ID's display. Often, the person receiving the call will be more familiar with the native language, may not be fluent in the English language or familiar with global characters, or simply may prefer the native name over its transliteration into global characters.

One solution would be to always transmit a caller's name in the native characters of the caller's native language. This solution would also have drawbacks. Often a person will call someone unfamiliar with the caller's native language. In such a circumstance, the called person's caller ID would display the native characters of the caller's name. If the called person does not understand the caller's native language, the displayed information on the caller ID would be useless. Therefore, in this circumstance, the called person would prefer a transliteration of the caller's name.

FIG. 1 is an example of a data packet containing caller ID information, in accordance with the background art. The data packet format is in accordance with signaling standards, such as ECMA-164. ECMA-164 specifies the standards for a private integrated services network (PISN) relating to the inter-exchange signaling protocol—name identification supplementary services. The contents of the ECMA standards are known to those in the art and are incorporated herein by reference.

The data packet example of FIG. 1 shows what the code set zero facility information element (IE) will look like when sending the calling name "Jirou Monden." The data packet can be characterized by twenty members in the information element. The first member 1 identifies that the information to follow is a code set zero facility IE, in other words caller ID information.

The second member 2 identifies the length of the IE (the number of octets following this octet). In this example, the number of octets to follow is "22," which translates into binary as 0010 0010, which means that thirty four octets will follow and constitute the complete code set zero facility IE.

Reference numerals 3–18, corresponding to the third to eighteenth members, relate to the following, respectively: Protocol length; Network facility extension (NFE) tag; NFE length; NFE contents; Interpretation application protocol data unit (IAPDU) tag; IAPDU length; IAPDU value; Protocol data unit (PDU) tag; PDU length; Invoke tag; Invoke length; Invoke contents; Operation tag; Operation length; Operation value; and Name argument tag. Reference can be had to the specifications of the ECMA standards, such as ECMA-164, if a more full understanding of these members is desired.

Member 19 identifies the length of the name argument, in other words, the number of octets to follow this octet, which will constitute the caller's name. In this example, the number of octets to follow is "0C," which translates into binary as 0000 1100, which means that twelve octets will follow and constitute the caller's name.

Member 20 is the caller's name. In this example, the binary code would represent the name "Jirou Monden," presented in a global character set, such as ISO-8859. The caller's name would be the last member in the data packet. This fact would be known to the system, since the length of the IE was specified in the member 2, discussed above.

As can be seen in the above example, the state of the art allows for the transmission of the caller's name in a single global character set. A person receiving the caller ID information data packet would be able to view only one version of the caller's name, i.e. the version of the caller's named encoded in the member 20.

SUMMARY OF THE INVENTION

The inventor of the present invention has appreciated the need in the art for a dual language caller ID system and method.

To this end, it is an object of the present invention to provide a caller ID system which is capable of transmitting a caller's name in dual languages.

The present invention provides a caller ID system and method which includes the ability to transmit a party's name in native language characters along with a transliteration of the party's name into global characters, such as Latin characters. The native characters could include Chinese, Japanese or Korean characters, as well as other characters of different languages. The caller ID information can be used to indicate a calling party's name to a called party, and/or to indicate a called party's name to a calling party. The user of the caller ID device can select native languages to be displayed. Whenever caller ID information includes a native language name matching the user's selected languages, the native language name will be displayed on the caller ID device. Otherwise, the transliteration of the native language name will be displayed.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is an illustration of a data packet containing a caller ID information element, in accordance with the background art;

FIG. 2 is an illustration of a data packet containing a caller ID information element, in accordance with the present invention;

DETAILED DESCRIPTION OF THE INVENTION

Figures 1, 2:
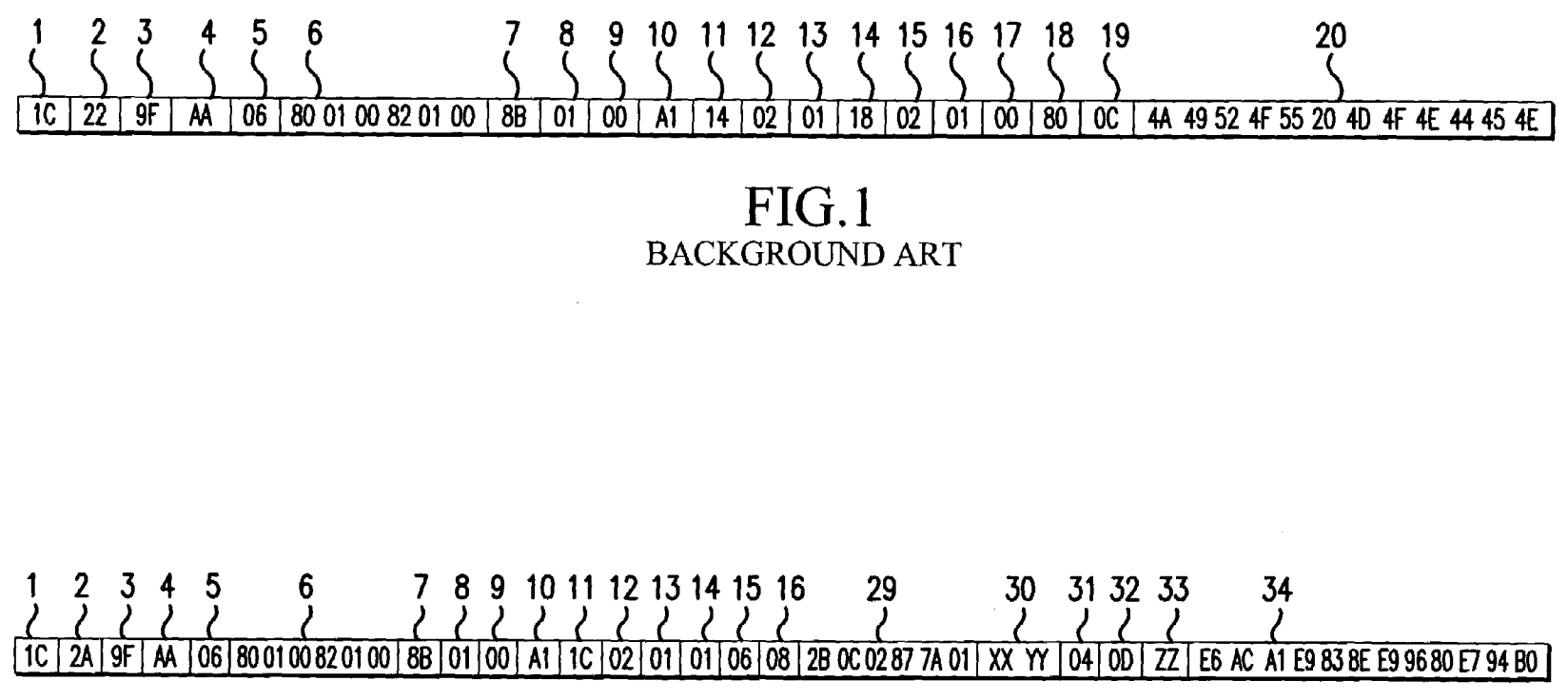

The ECMA standards allow optional data packets following the data packet illustrated and discussed in conjunction with FIG. 1. An optional data packet may be reserved for use by the equipment manufacturer, service provider, etc. The optional data packet is another code set zero facility IE called the manufacturer specific information (MSI).

FIG. 2 is an example of an optional data packet containing a caller ID information element, in accordance with the present invention. The optional data packet would be sent after the data packet of FIG. 1.

As illustrated in FIG. 2, the optional data packet includes many of the same or similar members, as illustrated in FIG. 1. Specifically, the optional data packet includes members 1–16. Reference can be made to the background art for a more complete understanding of the function and purpose of the members 1–16.

Member 29 includes a manufacturer or service provider identifier string. For example, member 29 could be used to indicate the service provider of the private branch exchange (PBX) from which the call originated, such as AVAYA, Inc.

Member 30 includes an application ID. The application ID indicates that the MSI includes a calling name in local characters. Member 31 includes a string tag. Member 31 serves to signal that forthcoming data relates to a caller's language/character set and local name.

Member 32 includes an octet string length. The octet string length indicates the number of octets to follow. In this example, the value "0D," translates into binary as 0000 1101, which corresponds to thirteen octets to follow.

Member 33 includes a language tag. The language tag describes the language or character set employed in the encoding of the caller's name. For example, 00=Japanese, 01=Korean, 10=Chinese (simplified), and 11=Chinese (traditional). Of course, more than four languages could be indicated via member 33. In fact, the octet of member 33 could indicate up to two hundred and fifty six different languages or character sets.

Figure 4:
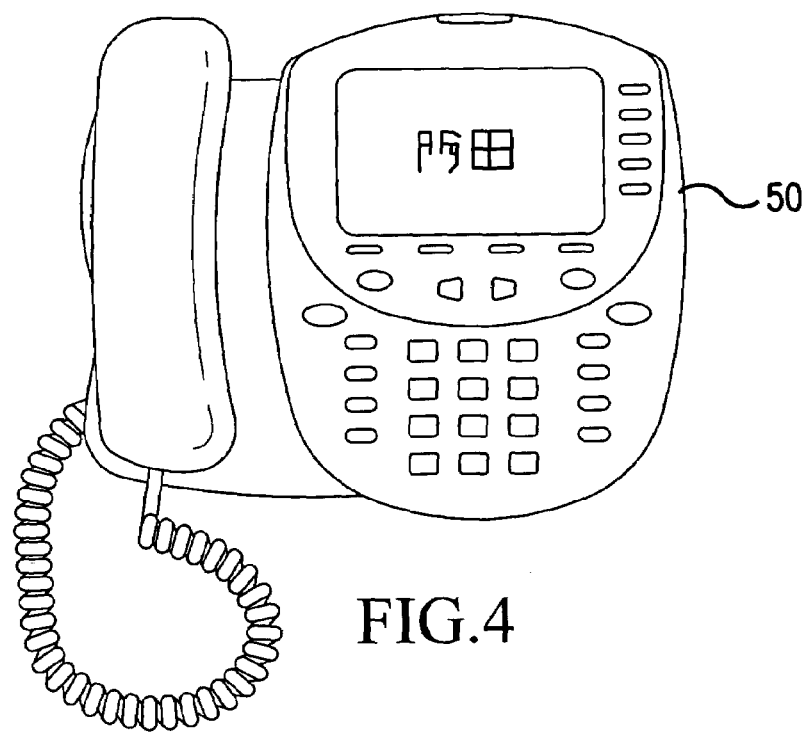
FIG. 4 is an illustration of a caller ID device displaying a caller's local language name.

Member 34 includes encoding to indicate the characters constituting the caller's local name. In this example, member 34 indicates a specific caller's name in the character set of the caller's native language, such as illustrated in FIG. 4.

It is envision that a universal character set, such as the one specified in international standard ISO-10646 or UTF-8 encoding, could be used to encode a person's name. ISO-10646 is a very comprehensive character set, which includes nearly all the character's used in nearly all languages. One tradeoff to using ISO-10646 is identifying the language since the same character code point value could be used to represent a character in Chinese, Japanese and Korean. This issue is addressed by member 33. It is also possible to have separate character sets, other than ISO-10646, for one or more languages. Separate character sets could allow the member 34 to be shorter in length, and/or allow for more characters to be represented in member 34.

The name data for members 20 and 34, as well as the language ID data of member 33, would be provided by the customer to the telephone service provider. The telephone service provider would typically, asks for such name data, when telephone service is first established.

Figure 3:
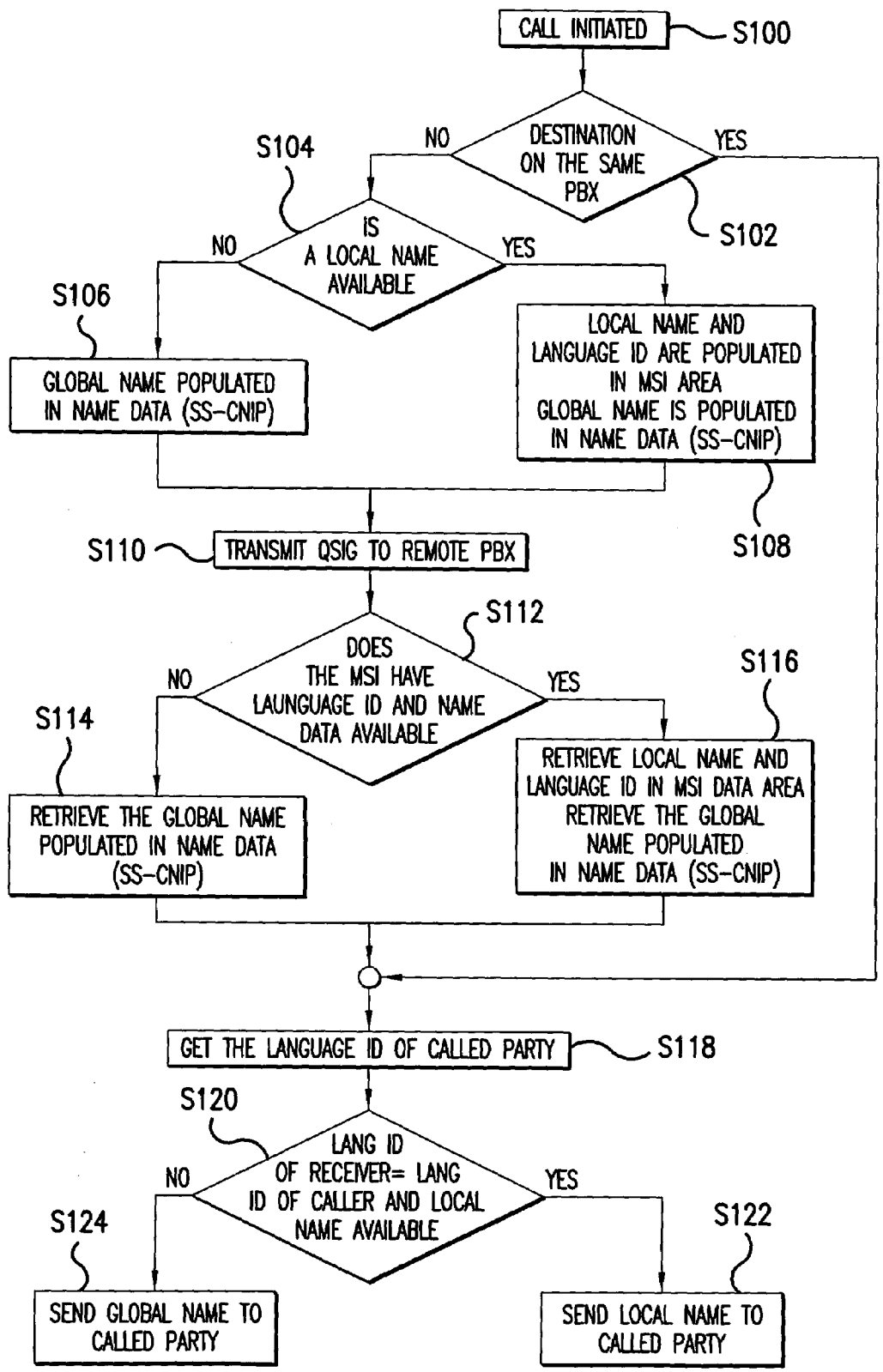
FIG. 3 is a flowchart illustrating a manner of operating a caller ID device, in accordance with the present invention.

FIG. 3 is a flow chart illustrating one method, in accordance with the present invention, for handling caller ID information. In the flow chart, in step S100, a call is initiated. The initiated call would include the caller ID information, such as the data packet of FIG. 1 followed by the data packet of FIG. 2.

In step S102, it is determined whether or not the destination of the call is on the same private branch exchange (PBX). If the call is destine for a called party outside the PBX, the process proceeds to step S104.

In step S104, it is determined whether or not a local name is available. The "local name" is the caller's name in the native character set of the caller. In other words, step S104 determines whether or not the optional data packet of FIG. 2 is following the traditional data packet illustrated in FIG. 1.

If no local name is available, the process proceeds to step S106. In step S106, the global name of the caller is populated in the name data portion of the supplemental services—calling name identification presentation (SS-CNIP). The "global name" refers to the transliteration of the caller's name into Latin characters, or simply the caller's name if the caller's language uses Latin characters. Basically, if no local name is available, step S106 places the encoded representation of the caller's name into member 20 of FIG. 1, in the traditional manner.

After step S106, the process proceeds to step S110. In step S110, the first data packet of FIG. 1 is transmitted as a "QSIG" to a remote PBX which includes the called party. The terms "QSIG," "Q reference point," or "Q-interface" are known in the art. The term QSIG refers to the signaling protocol for communication between private integrated services network exchanges, which are connected together to form a private integrated services network. The QSIG signaling protocol is specified in the ECMA standards, known to those of skill in the art.

If a local name is available in step S104, the process proceeds to step S108. In step S108, the local name and the language ID are populated in the optional information packet of FIG. 2. In other words, a code representing the caller's language is placed into member 33, and an encoded representation of the caller's local name is placed into member 34. Also, in step S108, the global name is populated in the member 20 in FIG. 1.

From step S108, the process proceeds to step S110. In step S110, the first data packet (FIG. 1) and second data packet (FIG. 2) are sent to a remote PBX. The data stream is again transmitted in a format which meets the requirements of a "QSIG" (a.k.a. "Q reference point" or "Q-interface"). The second data packet (FIG. 2) is treated as an optional manufacturer specific information (MSI), which is permitted in the QSIG signaling protocol.

In step S112, the QSIG is reviewed by the remote PBX to determine if the MSI has a language ID and local name data available. If the MSI does not include the language ID and local name, or if the MSI is not present, the process proceeds to step S114. In step S114, the global name is retrieved from the member 20.

If the MSI does include the language ID and local name, the language ID and local name are retrieved from members 33 and 34 in step S116. Also, in step S116, the global name, populated in member 20, is retrieved. After either of steps S114 or S116, the process proceeds to step S118.

Also, if it is determined in step S102 that the call is destined for a called party inside the PBX, the process bypasses steps S104, S106, S108, S110, S112, S114, and S116 and proceeds directly to step S118. The process may bypass the above-listed steps S104–S116 since it is not necessary to pass the caller ID information across the Q reference point between two different PBX's. Therefore, it is possible to have a local data format for the caller ID information, including the caller's local and global name data and language ID in some other data format, acceptable within the particular PBX where the call originated and is destined. The local data format could be the QSIG format, suitable for transfer to a remote PBX, or could be different from the QSIG format.

In step S118, a code representing the called party's language is obtained. A method for obtaining the called party's language will be discussed further in conjunction with FIG. 6 below.

After step S118, the process proceeds to step S120. In step S120, the language ID retrieved from member 33 is compared to the called party's language code. If the retrieve language ID matches the called party's language and a local name is available, the process proceeds to step S122. In step S122, the local name, from member 34, is displayed on the caller ID device of the called party.

If the retrieved language ID of member 33 did not match the called party's language, the process proceeds to step S124. In step S124, the global name of the calling party, from member 20, is displayed on the caller ID device of the called party.

FIG. 4 is an illustration of a caller ID device 50 displaying a local name 52 of a calling party, in accordance with step S122. In the case illustrated in FIG. 4, the retrieved language ID from member 33 matched the called party's language.

Figure 5:
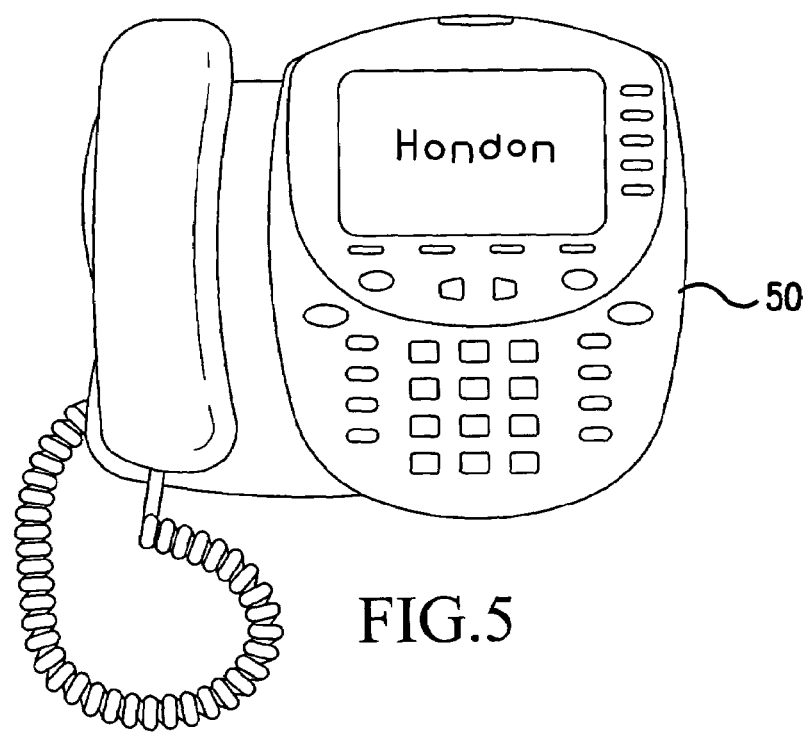
FIG. 5 is an illustration of a caller ID device displaying the caller's global name, which is a transliteration of a caller's local name.

FIG. 5 is an illustration of a caller ID device 50 displaying a global name 54 of a calling party, in accordance with step S124. In the case illustrated in FIG. 4, either the language ID from member 33 did not match the called party's language, or no local name was provided in the caller ID information (such as when the calling party's language uses the global character set, e.g. English, German).

The caller ID device illustrated in FIGS. 4 and 5 is a display of a corded telephone base. Of course, the present invention is applicable to all caller ID devices, such as displays on cordless or cellular phones, dedicated caller ID units, and/or computer maintained call logs.

It should be noted that since both a local name and global name are transmitted in the present invention, it would be possible to display both names on the caller ID device. The display could be designed to display both the global name and the local name simultaneously. Or, the display could alternate the display between the global name and the local name. For example, displaying the global name for one second and then displaying the local name for one second, and repeating this cycle.

Figure 6:
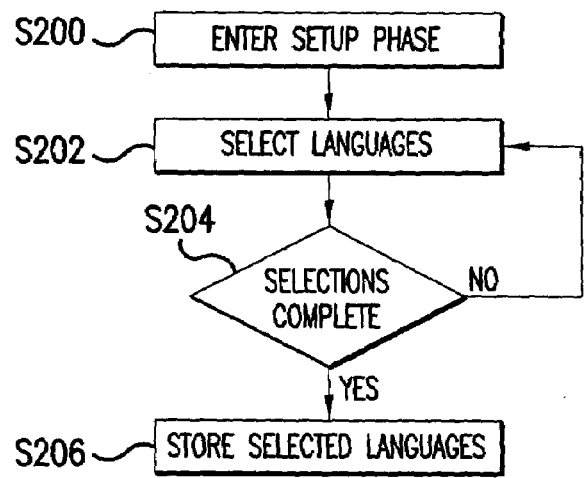
FIG. 6 is a flowchart illustrating a method for selecting a language or languages to be displayed on a caller ID device.

FIG. 6 is a flow chart illustrating one method of programming a caller ID device. The owner or user of the caller ID device can thereby setup the caller ID device to receive local names in a language or languages known to them. By setting the user's language, the caller ID system can determine whether or not caller ID information with a local name should have that local name displayed.

In step S200, the user enters a setup phase via a setup menu option. The setup menu could be presented on the caller ID display. In step S202, the user is prompted to select a native language. A sample menu screen is depicted in FIG. 7.

Figure 7:
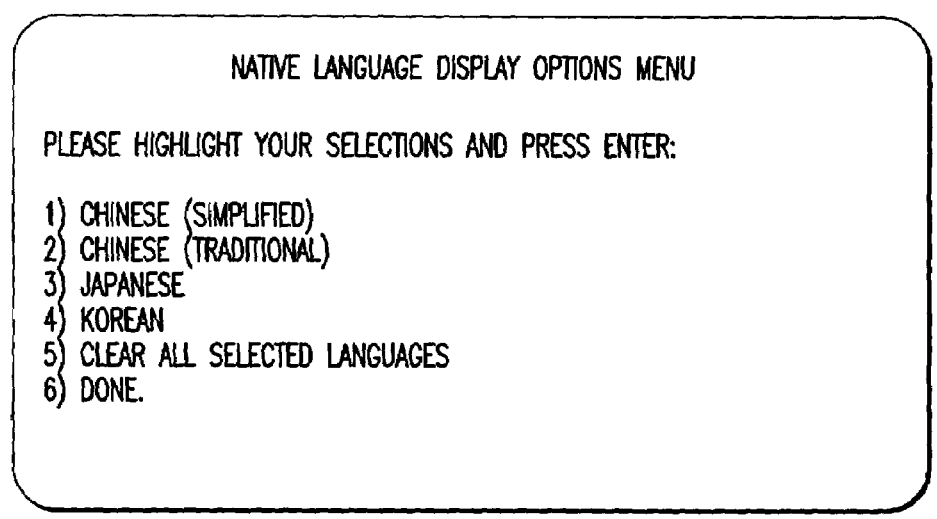
FIG. 7 is a sample menu used in the method of FIG. 6.

As illustrated in FIG. 7, the user may select one or more of the languages: Chinese (simplified), Chinese (traditional), Japanese, or Korean. Of course, additional languages could be included in the menu, such as Arabic, Indic, Khmer, Lao, Mongolian, Thai, Tibetan, Cherokee, etc. Presumably, the user would only select the languages known to those who rely on the caller ID device.

In step S204, it is determined whether or not the user has finished selecting languages. This could be accomplished by selecting the "done" option on the menu of FIG. 7. If the user is finished with selecting languages, the process proceeds to step S206. In step S206, a processor associated with the caller ID device stores a language code or language codes in a memory.

The language code or codes indicate the language or languages, which the user wishes to view on the display of the caller ID device. Whenever a calling party's language ID corresponds to one of the selected languages, that caller's local name will be displayed on the caller ID device. In other words, the stored language codes are retrieved in step S118 of FIG. 3, and used in the comparison of step S120 of FIG. 3.

As an alternative to the method of FIG. 6, the management of the local language selection could be handled by the telephone service provider. A person subscribing to caller ID would supply the service provider with a selection of native languages to be display on their caller ID unit. The service provider would handle the programming of the caller ID unit, either prior to distribution of the caller ID device or via a remote programming procedure over the telephone network wherein a modem of the caller ID device receives the remote programming. Alternatively, the service provider could control which native languages are forwarded to the subscriber's caller ID device.

Although the above description has been set forth in terms of displaying a calling party's name on called party's caller ID device, it should be noted that caller ID information may also flow in an opposite direction. The calling party can have a caller ID device which displays the name of the called party.

Like the protocols for calling name identification presentation (CNIP), there are also protocols for connected name identification presentation (CONP). The protocols for CONP are parallel in nature to the protocols for CNIP. In fact, the protocols for both CNIP and CONP are presented under the same standard ECMA-164, discussed in the background section above. It is within the scope of the present invention that the caller ID device would be used by either or both of the called party and the calling party.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A name identification information data stream used in telephone supplementary services comprising:
   a first data packet of information including first data representing a calling or called party's name in Latin, Greek or Cyrillic characters; and
   a second data packet of information including second data representing the calling or called party's name in native language characters, which are different than the characters used to represent the calling or called party's name in the first data packet, wherein both the first data packet and the second data packet are contained within the name identification information data stream associated with a telephone call.

2. The name identification information data stream according to claim 1, wherein the second data packet includes third data identifying a language type of the native language characters.

3. The name identification information data stream according to claim 2, wherein the language type is one of Chinese, Japanese and Korean.

4. The name identification information data stream according to claim 1, wherein the second data packet sequentially follows the first data packet in the name identification information data stream.

5. The name identification information data stream according to claim 1, wherein the second data packet is treated as a manufacturer specific information portion of the name identification information data stream.

6. The name identification information data stream according to claim 1, wherein the native language characters are one of Chinese ideograms, Hiragana characters, Katakana characters, and Korean characters.

7. The name identification information data stream according to claim 1, wherein the name identification information data stream identifies a calling party's name to a display associated with a called party's telephone.

8. The name identification information data stream according to claim 1, wherein the name identification information data stream identifies a called party's name to a display associated with a calling party's telephone.

9. The name identification information data stream according to claim 1, wherein the name identification information data stream meets the standards of ECMA-164 for the transmission of name identification supplementary services at a Q reference point between private integrated services network exchanges connected together within a private integrated services network.

10. A method of originating a name identification information data stream for transmission across a Q reference point between private integrated service network exchanges connected together within a private integrated services network, said method comprising the steps of:
    assembling a first data packet of information including first data representing a calling or called party's name in Latin, Greek or Cyrillic characters;
    assembling a second data packet of information including second data representing the calling or called party's name in native language characters, which are different than the characters used to represent the calling or called party's name in the first data packet; and
    transmitting the first and second data packets across the Q reference point.

11. The method according to claim 10, wherein the second data packet includes third data identifying a language type of the native language characters.

12. The method according to claim 10, wherein the first data packet is transmitted first followed by the second data packet.

13. The method according to claim 10, wherein said step of transmitting causes the first and second data packets to be sent across the Q reference point from a calling party to the called party, such that the name identification information data stream identifies the calling party's name, and further comprising the step of:
    displaying the calling party's name on a display associated with the called party's telephone.

14. The method according to claim 10, wherein said step of transmitting causes the first and second data packets to be sent across the Q reference point from a called party to the calling party, such that the name identification information data stream identifies the called party's name, and further comprising the step of:
    displaying the called party's name on a display associated with the calling party's telephone.

15. A method of operating a caller ID device comprising the steps of:
    providing a caller IID display, a user input device, a processor and a memory;
    running a selection menu, wherein a user is prompted to select one or more native languages;
    accepting a user's selected native language or languages;
    storing a first code, indicative of the selected native language or languages, in the memory;
    receiving caller ID information;
    evaluating the caller ID information to determine if a second code, indicative of a native language, is present in the caller ID information,
       if not, displaying a party's name encoded in the caller ID information in Latin, Greek or Cyrillic characters, and
       if so, comparing the second code with the first code; and
    based upon an outcome of said comparing step, displaying the party's name in either the Latin, Greek or Cyrillic characters or displaying the party's name in native language characters, which are different than the Latin, Greek or Cyrillic characters.

16. The method according to claim 15, wherein the party's name is displayed in the native language characters when the second code matches the first code, and wherein the party's name is displayed in the Latin, Greek or Cyrillic characters when the second code fails to match the first code.

17. The method according to claim 15, wherein the caller ID information is transmitted across a telephone network to indicate a calling party's name to a called party.

18. The method according to claim 15, wherein the caller ID information is transmitted across a telephone network to indicate to a called party's name to a calling party.

19. A method of operating a caller ID device comprising the steps of:
    providing a caller ID display, a user input device, a processor and a memory;
    running a selection menu, wherein a user is prompted to select one or more native languages;
    accepting a user's selected native language or languages;
    storing a first code, indicative of the selected native language or languages, in the memory;
    receiving caller ID information;
    reading a second code, indicative of a native language, from the caller ID information;

comparing the second code with the first code; and based upon an outcome of said comparing step, displaying the party's name in either the Latin, Greek or Cyrillic characters or displaying the party's name in native language characters, which are different than the Latin, Greek or Cyrillic characters.

20. The method according to claim 19, wherein the party's name is displayed in native characters when the second code matches the first code, and wherein the party's name is displayed in Latin, Greek or Cyrillic characters when the second code fails to match the first code.

21. A method of processing received caller ID data comprising the steps of:

receiving caller ID data;

analyzing the caller ID data to determine if a native language name, in characters other than Latin, Greek or Cyrillic, is present, if not, extracting a global name in Latin, Greek or Cyrillic characters from the caller ID data and displaying the global name via a display of a caller ID device;

if a native language name is present, extracting the native language name from the caller ID data; and displaying both the global name and the native language name on the display of the caller ID device.

22. The method according to claim 21, wherein said step of displaying includes simultaneously displaying both the global name and the native language name on the display of the caller ID device.

23. The method according to claim 21, wherein said step of displaying includes alternately displaying of the global name and the native language name on the display of the caller ID device.

24. An apparatus comprising:

a processor;

a memory connected to said processor;

and an input device connected to said processor for receiving an input indicating a native language or languages that a subscriber desires to have displayed as caller ID information on a subscriber's caller ID display in the event that native language data is present in incoming caller ID information, wherein said processor stores a first code indicative of the user's native language or languages in said memory, and wherein said processor compares said first code to a second code contained in incoming caller ID information, wherein said second code is indicative of a native language of the calling party.

25. The apparatus according to claim 24, wherein said input device includes input keys.

26. The apparatus according to claim 24, wherein said input device includes a modem connected to said processor for receiving an input from a remote office indicating a native language or languages of the user of the caller ID device.

27. The apparatus according to claim 24, wherein said processor, said memory and said input device are managed by a telephone service provider, such that the telephone service provider controls which native languages are forwarded to the subscriber's caller ID display.

28. The apparatus according to claim 24, wherein said processor, said memory and said input device are part of a subscriber's caller ID device and are managed by the subscriber, such that the subscriber's caller ID device receives the incoming caller ID information and controls which native languages are displayed on the subscriber's caller ID display.

* * * * *